2,885,266

PRODUCTION OF FOOD GRADE PHOSPHORIC ACID

Ronald C. Vickery, Cleveland, Ohio, assignor to Horizons Incorporated, Princeton, N.J., a corporation of New Jersey No Drawing. Application January 26, 1956
Serial No. 561,682

6 Claims. (Cl. 23—165)

This invention relates to the recovery of phosphoric acid and/or phosphates from material containing phosphate compounds. More particularly, it relates to a process for producing phosphoric acid of a purity sufficient to be useful as a food grade acid.

Materials containing inorganic phosphates are usually found in a naturally occurring state in a highly impure condition. Such naturally occurring phosphates are, in general, wholly unsuited to direct conversion into food grade phosphoric acid, particularly for human consumption. One typical specification of food grade acid limits the impurities in parts per million, as follows:

| | P.p.m. |
|---|---|
| Iron | less than 2.0 |
| Chlorine | less than 2.0 |
| Fluorine | less than 0.4 |
| Chromium | less than 0.2 |
| Lead | less than 0.2 |
| Copper | less than 0.1 |
| Arsenic (as oxide) | less than 0.2 |

In addition, the $P_2O_5$ content is required to be at least 54.32% or, expressed as $H_3PO_4$, 75.75%; with a content of sodium oxide not greater than 0.02% in weight. To meet such a rigorous standard, it is necessary that most, and indeed substantially all, of the impurities be removed from the phosphate as it occurs naturally. Since the naturally occurring phosphates have long been recognized as the logical starting point for the manufacture of chemically pure phosphates and food grade phosphoric acid, many processes thave been suggested for the preparation of phosphates from naturally occurring phosphate rock.

One such process is described in three expired United States patents issued to Charles H. Milligan, namely 1,838,431; 1,929,441 and 1,929,442. The process therein disclosed involves contacting a material containing inorganic phosphates with sulphuric acid and thereafter extracting the resulting products with an organic extraction liquid such as an alcohol, aldehyde or ketone. I have found that when practicing the patented process, if the original phosphatic material contains substantial amounts of impurities associated with the calcium phosphate, the impurities are usually extracted along with the phosphoric acid and hence, food grade phosphoric acid cannot be obtained from materials containing significant amounts of iron, aluminum, titanium, lead or other impurities.

I have discovered a method for processing the phosphate rock in which the impurities present in the naturally occurring phosphate material are not carried over into the final product, which is of the quality required to meet the stringent requirements of a food grade acid.

In accordance with my invention the production of food grade phosphoric acid is accomplished by first contacting the natural phosphate, preferably in comminuted form, with a suitable solvent for many of the above undesirable impurities. The extraction proceeds at an elevated temperature, for several hours, after which the mass is filtered. The washed filter cake is then denned with sulphuric acid in the usual manner. The product, an aqueous slurry of calcium sulfate and phosphoric acid is diluted with water and is then extracted with butanol in the manner, for example, which is taught in U.S. Patents 1,929,441 and 1,929,442. The butanol extract is separated from the remaining residue and is back-extracted with water to recover the phosphoric acid contained therein.

More particularly, in accordance with my invention, the phosphorite used, a naturally occurring phosphate rock consisting primarily of calcium phosphate with significant amounts of iron, magnesium, silicon, aluminum and manganese and minor amounts of sodium, titanium, chromium, strontinum and uranium, was ground to a particle size between 70 and 80 mesh (Tyler standard) for most of the experiments performed. It was found that grinding to a finer particle size, e.g. 200 mesh (Tyler standard) did not produce sufficient benefits to justify the additional processing.

The ground phosphorite was digested with phosphoric acid in concentrations between about 5% and 40% and at temperatures between 25° C. and 95° C., for a sufficient length of time to dissolve a substantial portion of the impurities, particularly the iron content of the rock. The digestion was effected by heating and stirring the ground rock with a suitable volume of phoshporic acid. The material after reaction was found to have assumed a rocklike hardness and required pulverization before it could be treated further. In all instances, there was considerable evidence of reaction, the individual grains of rock having been broken down to finer, less discrete particles. My preferred procedure is to extract phosphate rock with twice its weight of 20% phosphoric acid at a temperature between about 65° C. and 75° C. for several hours. In some instances a portion of the phosphoric acid produced by my process may serve as the extraction agent.

I have found that a given volume of 20% phosphoric acid is more effective in removing the impurities contained in the phosphate rock than either higher or lower concentrations. With 5% acid, some hydrolysis of the iron phosphate formed by reaction with the acid was noted before and during the washing of the rock.

After the phosphate rock had been treated with phosphoric acid to effect solution of most of the impurities contained therein, the resulting mass was filtered. The filter cake was washed with water or with a 1% solution of phosphoric acid, until the washings were iron-free. The washings were discarded in the usual manner of operation, although they may be added to the filtrate when significant amounts of iron phosphate were found to be present therein. The filtrate, with or without the additional wash water, was heated to precipitate such impurities as iron, aluminum and the like as phosphates.

The filter cake was analyzed to determine the amount of sulphuric acid required to convert the calcium phosphate present into phosphoric acid in the known manner. The filter cake was then denned with 95% of the theoretical requirement of sulphuric acid at temperatures between 65° C. and 75° C. for up to 24 hours. Water was added to the sulphated rock and the resulting slurry, which is largely a calcium sulphate dispersion in phosphoric acid, was then extracted with butyl alcohol. The liquid was separated from the solids by decantation and the solids were again subjected to extraction by butyl alcohol. Instead of butyl alcohol, any of the organic extraction agents disclosed in the aforementioned patents may be used.

With the addition of water, the phosphoric acid is stripped from the butanol. The liquids form two phases and separate into two layers which are readily poured off from one another. To remove any phosphoric acid remaining in the butanol, water is again added to the butanol. The second extract is combined with the first and the butanol is then returned to the process for further use in the process.

The aqueous extract, a dilute solution of phosphoric acid, contains a small amount of butanol determined by the partition coefficients in the system butanol-phosphoric acid-water. To remove the butanol, benzene or another suitable solvent is brought into contact with the extract. The dilute food grade phosphoric acid is immiscible in and insoluble in the benzene in which the butanol readily dissolves. The benzene-butanol fraction which is separated cleanly from the aqueous acid, may be separated into its components by azeotropic distillation, whereby the benzene and butanol are recovered and returned to the process.

It was found that organic matter present in the phosphatic material was ultimately extracted by the butanol, with a resultant discoloration of the alcohol. Although the discoloration was not transferred to the aqueous phase produced by re-extracting the alcohol extract with water, the possible buildup of such organic discolorant in recycled butanol was not considered desirable. Destruction of organic matter was easily accomplished by roasting at 700–800° C. Surprisingly enough, when using the roasted material, butanol extracts remained uncolored, even though containing iron. Accordingly when the original phosphate material contains organic matter, it is preferable to roast the material prior to further processing. The process is further illustrated in the following examples which are to be considered illustrative, but not limitative, of my invention.

In each of the following experiments the phosphorite employed was of unknown origin, containing:

32.6% $P_2O_5$ (by weight)
7.21% $SiO_2$
48.3% $CaO$
0.26% $MgO$
1.46% $Fe_2O_3$
4.07% $Al_2O_3$
Less than 0.01% $MnO$ The loss on ignition was 3%, due largely to $CO_2$. Spectrographic analysis revealed Na, Ti, Cr, Sr and U as minor constituents. The reagents used for all experiments were of analytical grade. The sulfuric acid contained 0.00002% maximum iron, the phosphoric acid contained 0.03% maximum iron, and the butanol gave no reaction for either iron or aluminum. The analyses for iron were made colorimetrically and were checked by titration, in the usual manner.

*Example I*

A sample of phosphorite was crushed to pass an 80 mesh (Tyler standard) screen. Two hundred grams of the sample was denned with fifty grams of sulfuric acid for 48 hours. To a fifty gram sample of the product, one hundred milliliters of 5% phosphoric acid were added. This was digested on a steam bath for 48 hours. The product was filtered and then extracted with butanol. The butanol extract was then extracted with water. The resulting aqueous phase contained the phosphoric acid. The iron content of the filtrate was .082%, much too high for a food grade acid.

*Example II*

A fifty gram sample of phosphate rock was roasted at about 750° C. The roasted phosphate rock was reacted with one hundred milliliters of a 5% phosphoric acid. The reacted material was slurried with water, filtered and the filtrate tested for iron, it contained 0.038 gram of iron. The solid phase was denned with sulphuric acid for 24 hours and then extracted with four hundred and fifty milliliters of butanol. The butanol phase contained about 0.1% iron, showing that while the preliminary treatment with phosphoric acid removed some iron, it was not sufficient to bring the iron down to the desired value.

*Example III*

Example II was repeated with unroasted phosphorite and the results were not substantially different.

*Example IV*

Example II was repeated, using twice as much 5% phosphoric acid. The reaction was effected by heating the reagents for two hours, to about the boiling temperature, with stirring. The aqueous filtrate contained 0.25 gram of iron and the butanol phase contained about 0.1% iron, showing that while more iron was dissolved by the phosphoric acid, the amount removed was still not sufficient for the production of a food grade acid.

*Example V*

A one hundred gram sample of roasted phosphorite was reacted with two hundred milliliters of a 20% phosphoric acid solution at between about 50° and 60° C. for two and one-half hours. Decomposition of this sample was much more evident than that of Examples I–IV with 5% phosphoric acid. The reacted mass was filtered and washed with water until the washings were free of iron. The filtrate contained 0.59 gram of iron. The filter cake was denned with sulfuric acid for 24 hours. Water was added to the product and the resulting slurry was extracted with butanol. The extract contained less than 0.015 gram of iron.

*Example VI*

Example V was repeated substituting 10% phosphoric acid for the 20% phosphoric acid. The extraction was qualitatively slightly inferior to that of the preceding example, but the results were otherwise comparable.

*Examples VII–IX*

Example V was repeated with the following differences:

| Example | Unroasted Rock, grams | Phosphoric Acid | Temperature, Time |
|---|---|---|---|
| VII | 100 | 200 ml.—20% | boiling point, 4½ hrs. |
| VIII | 100 | 46 ml.—78% | boiling point, 14 hrs. |
| IX | 100 | 200 ml.—20% | 75° C., 3 hrs. |

In each of the above, after reaction between the phosphate rock and phosphoric acid was effected, the reaction mass was slurried with water and filtered. The aqueous filtrates contained 1.35, 1.4, 1.22 grams of iron respectively, indicating removal of the major portion of this impurity by the treatment set forth.

Six additional runs were made in which the phosphorite was reacted at 65°–75° C. with twice its weight of 20% phosphoric acid, for between 3 and 8 hours. The reaction mass was filtered and washed until the washings were iron free. Then the washed filter cake was denned at about 75° C. with 95% of the theoretical requirement of sulphuric acid for periods up to 48 hours. The sulfated rock was then slurried with water and extracted with twice its weight of butanol. The iron content of the butanol extract was found to be less than 0.0005%. The butanol extract was re-extracted with water to yield an aqueous solution of phosphoric acid with an average content of $H_3PO_4$ of 72.91% and an iron content of less than 0.00024%. After evaporation, to obtain the desired concentration of acid, both would be well within the specification of a food grade acid. In addition, the acid obtained was found by analysis to meet the specifications of a food grade acid for chlorine, fluorine, chromium, lead, copper, arsenic and sodium.

In the foregoing examples, the butanol extraction, the re-extraction of the butanol phase with water, and the final removal of butanol from the acid produced were conducted as a batch operation. It will be understood by those skilled in the art, that more efficient and more complete extractions are attainable by countercurrent extraction in each instance and accordingly, I do not wish to be limited as to the manner of extraction.

The impurities removed by the reaction with phosphoric acid may be removed from the phosphoric acid by precipitating them, for instance, by heating the filtrate from this step. Iron phosphate recovered in this way may be separated from the other phosphates removed from the original crude phosphatic material. The filtrate is recycled to leach additional crude phosphatic material in a repetition of the process. If required, phosphoric acid produced in a later stage of the process may be added as make-up to the initial extraction liquor.

When alkali metal or ammonium phosphates are desired, they may be obtained by direct addition of the appropriate base to the aqueous solution of the pure phosphoric acid produced in my process.

In order to recycle the acid used in leaching out the various impurities such as iron and aluminum from the crude phosphorite, I have found that the spent leach liquor, produced when 20% phosphoric acid is brought into contact with the phosphorite, may be purified by dilution with about 4 to 5 times its weight of water and boiling for about 30 minutes. The metallics leached from the crude phosphate material are thereby precipitated as hydrolyzed phosphates and may be readily separated from the dilute acid. The dilute acid containing a concentration of between 3% and 5% $H_3PO_4$ is then returned to the leaching stage serving either to dilute concentrated phosphoric acid to 20% concentration, to dilute the leach liquor, or, after concentration to 20% for direct extraction of further crude phosphorite.

I claim:

1. A method of producing food grade phosphoric acid from impure phosphate rock containing more than about 0.5% iron, which comprises: leaching the impure phosphate rock with about twice its weight of a 20% phosphoric acid at an elevated temperature between about 50° C. and 95° C. and for a time sufficient to remove by solution, the major portion of the metallic impurities soluble in said phosphoric acid; separating the resultant product into a solid portion and a liquid portion; diluting the liquid portion with water; boiling the water-diluted liquid portion to precipitate the metallic impurities dissolved therein; separating the precipitate from the accompanying liquid; and returning the said liquid to the leaching liquid in a repetition of the process; washing the filter cake with water until the washings are iron-free; denning the filter cake with sulphuric acid to produce a mixture containing calcium sulfate and phosphoric acid; extracting the phosphoric acid from the mixture so formed by means of an organic extraction agent, selected from the group of water immiscible oxygenated hydrocarbons and consisting of alcohols, ketones and aldehydes having at least three and not more than eight carbon atoms in the chain carrying the oxygen group; and extracting the phosphoric acid from the phosphoric acid containing organic extraction liquid by contacting said liquid with water, to produce an aqueous solution of food grade phosphoric acid and a solution of the organic extraction agent, and recovering the solution of food grade phosphoric acid product.

2. The method of claim 1 in which the organic extraction agent is butanol and the aqueous phosphoric acid recovered therefrom is extracted with benzene to strip the butanol remaining therein, and returning a portion of the resulting dilute phosphoric acid to the process for leaching of additional impure phosphate material.

3. In a method of producing food grade phosphoric acid from impure phosphate rock containing more than about 0.5% iron and containing other metallic impurities in the form of their compounds, the improvements which comprise: leaching the impure phosphate rock with about twice its weight of 20% phosphoric acid at a temperature between about 50° C. and 95° C., for a time sufficient to dissolve the major portion of the metallic compounds in the dilute phosphoric acid; separating the resultant mixture into an impurity containing liquid portion and a purified solid product; retaining the separated purified solid product for recovery therefrom of food grade phosphoric acid; diluting the separated liquid with between about 4 and about 5 times its weight of water; boiling the resultant solution consisting of the filtrate and water of dilution for about 30 minutes whereby the metallic impurities leached from the impure phosphate rock are precipitated as hydrolyzed phosphates; separating the precipitated phosphates to recover same; and returning the remaining liquid to the leaching of further quantities of impure phosphate rock in a continuation of the process.

4. The method of claim 3 in which the liquid returned to the leaching step is concentrated by evaporation to increase the acid concentration to about 20% prior to effecting any leaching.

5. The method of claim 3 in which the liquid returned to the leaching step is added to more concentrated phosphoric acid to dilute same to the desired concentration for leaching.

6. The process of claim 3 in which the impure phosphate rock is calcined to remove organic matter therefrom prior to leaching of same.

References Cited in the file of this patent

UNITED STATES PATENTS

| | | |
|---|---|---|
| 1,857,470 | Milligan et al. | May 10, 1932 |
| 1,929,442 | Milligan | Oct. 10, 1933 |
| 1,944,048 | Walker et al. | Jan. 16, 1934 |
| 2,492,714 | Singer | Dec. 27, 1949 |